US008228319B2

(12) United States Patent
Furihata et al.

(10) Patent No.: US 8,228,319 B2
(45) Date of Patent: Jul. 24, 2012

(54) DISPLAY DEVICE AND CONTROLLER DRIVER FOR IMPROVED FRC TECHNIQUE

(75) Inventors: Hirobumi Furihata, Kanagawa (JP); Takashi Nose, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 891 days.

(21) Appl. No.: 11/984,795

(22) Filed: Nov. 21, 2007

(65) Prior Publication Data

US 2008/0117198 A1 May 22, 2008

(30) Foreign Application Priority Data

Nov. 22, 2006 (JP) ................................ 2006-315740

(51) Int. Cl.
*G06F 3/038* (2006.01)

(52) U.S. Cl. ........................................................ 345/204

(58) Field of Classification Search ............ 345/87–104, 345/204–699
See application file for complete search history.

(56) References Cited

U.S. PATENT DOCUMENTS

| | | | | |
|---|---|---|---|---|
| 6,466,220 B1 * | 10/2002 | Cesana et al. | 345/537 |
| 7,542,030 B2 * | 6/2009 | Jang et al. | 345/204 |
| 7,710,377 B2 * | 5/2010 | Kang et al. | 345/96 |
| 2004/0130559 A1 * | 7/2004 | Lee et al. | 345/690 |
| 2004/0252891 A1 * | 12/2004 | Sasaki | 382/232 |
| 2005/0104907 A1 * | 5/2005 | Neal | 345/690 |
| 2005/0110796 A1 * | 5/2005 | Flowers et al. | 345/589 |

FOREIGN PATENT DOCUMENTS

| | | |
|---|---|---|
| JP | 06-301357 A | 10/1994 |
| JP | 8-301357 A | 10/1994 |
| JP | 07-333582 A | 12/1995 |
| JP | 7-333582 A | 12/1995 |
| JP | 11-038944 A | 2/1997 |
| JP | 11-38944 A | 2/1999 |
| JP | 2003-162272 A | 6/2003 |
| JP | 2003-162272 | 6/2006 |
| JP | 2003-162272 A | 6/2006 |
| JP | 2006-315740 * | 11/2006 |

OTHER PUBLICATIONS

Japanese Office Action dated Oct. 28, 2011, with partial English translation.

Japanese Office Action dated May 7, 2012 with an English-language translation thereof.

* cited by examiner

*Primary Examiner* — Alexander Eisen
*Assistant Examiner* — Mark Regn
(74) *Attorney, Agent, or Firm* — McGinn IP Law Group, PLLC

(57) ABSTRACT

A display device includes a display panel and a controller driver. The controller driver includes: a preceding image processing stage performing color-reduction processing on input image data to generate color-reduced image data; a memory; a latter image processing stage to perform modification processing on the color-reduced image data received from the memory to generate output image data; and a driver circuit driving the display panel in response to the output image data. The latter image processing stage is provided with a counter generating a counter value; a binary LUT outputting an LUT output value in response to the counter value and coordinates of a target pixel selected from the plurality of pixels; and a selector section generating the output image data from the color-reduced image data in response to the LUT output value. The bit width of the output image data is identical to that of the color-reduced image data.

20 Claims, 10 Drawing Sheets

Fig. 2

51

| | X0 | X1 | X2 | X3 |
|---|---|---|---|---|
| Y0 | 2 | 1 | 0 | 3 |
| Y1 | 0 | 3 | 2 | 1 |
| Y2 | 3 | 0 | 1 | 2 |
| Y3 | 1 | 2 | 3 | 0 |

Fig. 4

42

| | | VSYNC COUNTER VALUE | | | | | | | | | | | | | | | |
|---|---|---|---|---|---|---|---|---|---|---|---|---|---|---|---|---|---|
| | | 0 | | | | 1 | | | | 2 | | | | 3 | | | |
| | | X0 | X1 | X2 | X3 | X0 | X1 | X2 | X3 | X0 | X1 | X2 | X3 | X0 | X1 | X2 | X3 |
| LUT OUTPUT VALUE | Y0 | 1 | 0 | 0 | 1 | 0 | 0 | 0 | 1 | 1 | 0 | 0 | 0 | 0 | 1 | 0 | 1 |
| | Y1 | 0 | 1 | 1 | 0 | 0 | 1 | 0 | 0 | 0 | 1 | 1 | 1 | 0 | 0 | 0 | 0 |
| | Y2 | 0 | 0 | 0 | 0 | 1 | 0 | 1 | 1 | 1 | 0 | 0 | 0 | 1 | 0 | 0 | 1 |
| | Y3 | 1 | 0 | 1 | 0 | 0 | 1 | 0 | 0 | 0 | 0 | 1 | 0 | 0 | 1 | 1 | 0 |

Fig. 6

71

| | X0 | X1 | X2 | X3 |
|---|---|---|---|---|
| Y0 | 1 | 3 | 1 | 3 |
| Y1 | 3 | 1 | 3 | 1 |
| Y2 | 1 | 3 | 1 | 3 |
| Y3 | 3 | 1 | 3 | 1 |

Fig. 7

42

| | VSYNC COUNTER VALUE | | | | | | | | | | | | | | | |
|---|---|---|---|---|---|---|---|---|---|---|---|---|---|---|---|---|
| | 0 | | | | 1 | | | | 2 | | | | 3 | | | |
| LUT OUTPUT VALUE | 0 | 1 | 0 | 1 | 0 | 0 | 0 | 0 | 0 | 1 | 0 | 1 | 0 | 0 | 0 | 0 |
| | 0 | 0 | 0 | 0 | 1 | 0 | 1 | 0 | 0 | 0 | 0 | 0 | 1 | 0 | 1 | 0 |
| | 0 | 1 | 0 | 1 | 0 | 0 | 0 | 0 | 0 | 1 | 0 | 1 | 0 | 0 | 0 | 0 |
| | 0 | 0 | 0 | 0 | 1 | 0 | 1 | 0 | 0 | 0 | 0 | 0 | 1 | 0 | 1 | 0 |

Fig. 9 PRIOR ART

| | X0 | X1 | X2 | X3 |
|---|---|---|---|---|
| Y0 | 2 | 1 | 0 | 3 |
| Y1 | 0 | 3 | 2 | 1 |
| Y2 | 3 | 0 | 1 | 2 |
| Y3 | 1 | 2 | 3 | 0 |

Fig. 10 PRIOR ART

| | | VSYNC COUNTER VALUE | | | | | | | | | | | | | | | |
|---|---|---|---|---|---|---|---|---|---|---|---|---|---|---|---|---|---|
| | | 0 | | | | 3 | | | | 1 | | | | 2 | | | |
| | | X0 | X1 | X2 | X3 | X0 | X1 | X2 | X3 | X0 | X1 | X2 | X3 | X0 | X1 | X2 | X3 |
| CARRY | Y0 | 0 | 0 | 0 | 0 | 1 | 1 | 0 | 1 | 0 | 0 | 0 | 1 | 1 | 0 | 0 | 1 |
| | Y1 | 0 | 0 | 0 | 0 | 0 | 1 | 1 | 1 | 0 | 1 | 0 | 0 | 0 | 1 | 1 | 0 |
| | Y2 | 0 | 0 | 0 | 0 | 1 | 0 | 1 | 1 | 1 | 0 | 0 | 0 | 1 | 0 | 0 | 1 |
| | Y3 | 0 | 0 | 0 | 0 | 1 | 1 | 1 | 0 | 0 | 0 | 1 | 0 | 0 | 1 | 1 | 0 |

DISPLAY DEVICE AND CONTROLLER DRIVER FOR IMPROVED FRC TECHNIQUE

This application claims the benefit of priority based on Japanese Patent Application No. 2006-315740, filed on Nov. 22, 2006, the disclosure of which is incorporated herein by reference.

BACKGROUND OF THE INVENTION

1. Field of the Invention

The present invention relates to a display device and controller driver, more specifically, to a display device and controller driver, which are used for displaying images by using an FRC (frame rate control) technique.

2. Description of the Related Art

Recently, the circuit sizes of the display memory and the DA converter circuit integrated within an LCD controller driver tend to be increased due to the requirements of enhanced resolution and increased color depth in display devices incorporated within cell phones and other portable devices. Although a controller driver IC, especially used in a cell phone or other portable devices, is desired to have a reduced power consumption and circuit size, the increase in the circuit size of the display memory and DA converter undesirably causes the increase in the power consumption and circuit size of the controller driver.

Additionally, requirements imposed on recent display devices include superior image quality. Therefore, it is desired to reduce the image flicker in the display devices, especially in the LCD (liquid crystal display) devices.

Japanese Laid-Open Patent Application No. 2003-162272 (hereinafter, referred to as the '272 application) discloses an image processor which provides image processing that achieves image quality as high as a commonly-used image rastering technique with a reduced memory capacity. The disclosed image processor also decreases a required transmission capacity in transmitting raster image data, while suppressing image quality deterioration. In detail, the image processor generates a bit-plane-reduced image wherein the number of bit-planes thereof is reduced less than that of the original raster image. Thereafter, the image processor generates a bit-plane-increased image wherein the number of bit-planes thereof is more than that of the bit-plane-reduced image and less than that of the original raster image. The '272 application also discloses a technique for reducing the circuit sizes of the display memory and DA converter by using an FRC technique.

FIG. 8 shows an image processor disclosed in the '272 application as a sixth embodiment. The image processor, denoted by the numeral 100, includes a preceding image processing stage 104, a memory 102, an FRC latter image processing stage 109, and an image display unit 103A. The FRC latter image processing stage 109 is composed of a threshold value generator 111B, a two-bit counter 119, a carry generator 120, and a selector 113. The preceding image processing stage 104 receives from a computer a raster image 101 which represents the grayscale level of each pixel with six bits for each of red (R), green (G) and blue (B), and performs color-reduction processing on the received raster image data 101 to generate another raster image data that represents the grayscale level of each pixel with four bits for each of red (R), green (G) and blue (B). The memory 102 stores therein the raster image data received from the preceding image processing stage 104. The threshold value generator 111B generates a threshold value on the basis of the XY-coordinates of the target pixel. The two-bit counter 119 outputs a counter output value. The counter output value is cyclically updated, every when a vertical sync signal Vsync is activated. In detail, the counter output value is sequentially set to "00", to "11", to "01", and to "10" in response to the vertical sync signal Vsync, and then reset to "00". The same step is repeated thereafter. The carry generator 120 generates a carry in response to the counter output value received from the two-bit counter 119. In detail, the carry generator 120 sets the carry to "1" when the counter output value is smaller than the threshold value received from the threshold value generator 111B; otherwise, the carry generator 120 sets the carry to "0". As thus described, the carry is generated on the basis of the threshold value in a cycle of four frames. The selector 113 is responsive to the carry received from the carry generator 120 for selectively outputting a value selected from the value obtained by adding one to the output value of the memory 102 and the output value of the memory 102, to the image display unit 103A. The image display unit 103A displays the image of the raster image data 101 with the color depth of four bits for each color, in response to the output from the selector 113.

When the threshold value generator 111B outputs the threshold value as shown in FIG. 9, a carry generator 120 sets the carry as shown in FIG. 10. The FRC latter image processing stage 109 selects the value obtained by adding one to the output value of the memory 102, when the output of the carry generator 120 is "1". In a case of a display device in which the grayscale level of "0" indicates the darkest brightness, the brightness of the entire image is increased as the increase in the frequency in which the carry is set to the value "1"; in other words, the brightness is increases as the increase in the probability in which the carry generator 120 sets the carry to the value "1". Therefore, the brightness of the entire image for the Vsync counter value of "3" is higher than that for the Vsync counter value of "0", since the probability of the carry being set to "1" is 0/16 for the Vsync counter value of "0", while the probability of the carry being set to "1" is 12/16 for the Vsync counter value of "3", as shown in FIG. 10. In the operation, the carry is cyclically updated, and this undesirably causes the flicker in the displayed image.

Additionally, the disclosed image processor is not suitable for displaying black-and-white images. When executing an e-mail application or other applications, the display device often displays black-and-white images. The disclosed image processor implements the FRC processing even when the image data of the target pixel are all-0 or all-1. This undesirably causes the flicker in displaying black-and-white images, resulting in displaying white dots in the black background or displaying black dots in the white background.

SUMMARY

In an aspect of the present invention, a display device is provided with a display panel on which a plurality of pixels are provided; and a controller driver driving the display panel in response to input image data. The controller driver includes: a preceding image processing stage adapted to perform color-reduction processing on the input image data by using a dither matrix to generate color-reduced image data; a memory adapted to store the color-reduced image data; a latter image processing stage adapted to perform modification processing on the color-reduced image data received from the memory to generate output image data; and a driver circuit driving the display panel in response to the output image data. The latter image processing stage is provided with a counter generating a counter value so that the counter value is updated every frame period; a binary LUT outputting an LUT output value in response to the counter value and coordinates of a target pixel selected from the plurality of pixels; and a selector section generating the output image data from the color-reduced image data in response to the LUT output value. The bit width of the output image data is identical to that of the color-reduced image data. The value of the output image data is identical to the corresponding value of the color-reduced image data when the LUT output value is a first value, while the value of the output image data is modified from the corresponding value of the color-reduced image data when the LUT output value is a second value different from the first value.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 2 shows an exemplary content of a dither matrix used in color-reduction processing;

FIG. 4 shows an exemplary content of a binary LUT used in the latter image processing stage shown in FIG. 3;

FIG. 6 shows an exemplary content of a dither matrix used in color-reduction processing in a third embodiment;

FIG. 7 is an exemplary content of a binary LUT in the third embodiment;

FIG. 9 is a table showing the threshold value generated by a threshold value generator integrated within the image processor shown in FIG. 8; and FIG. 10 is a table showing the value of the carry generated by a carry generator integrated within a conventional image processor shown in FIG. 8.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
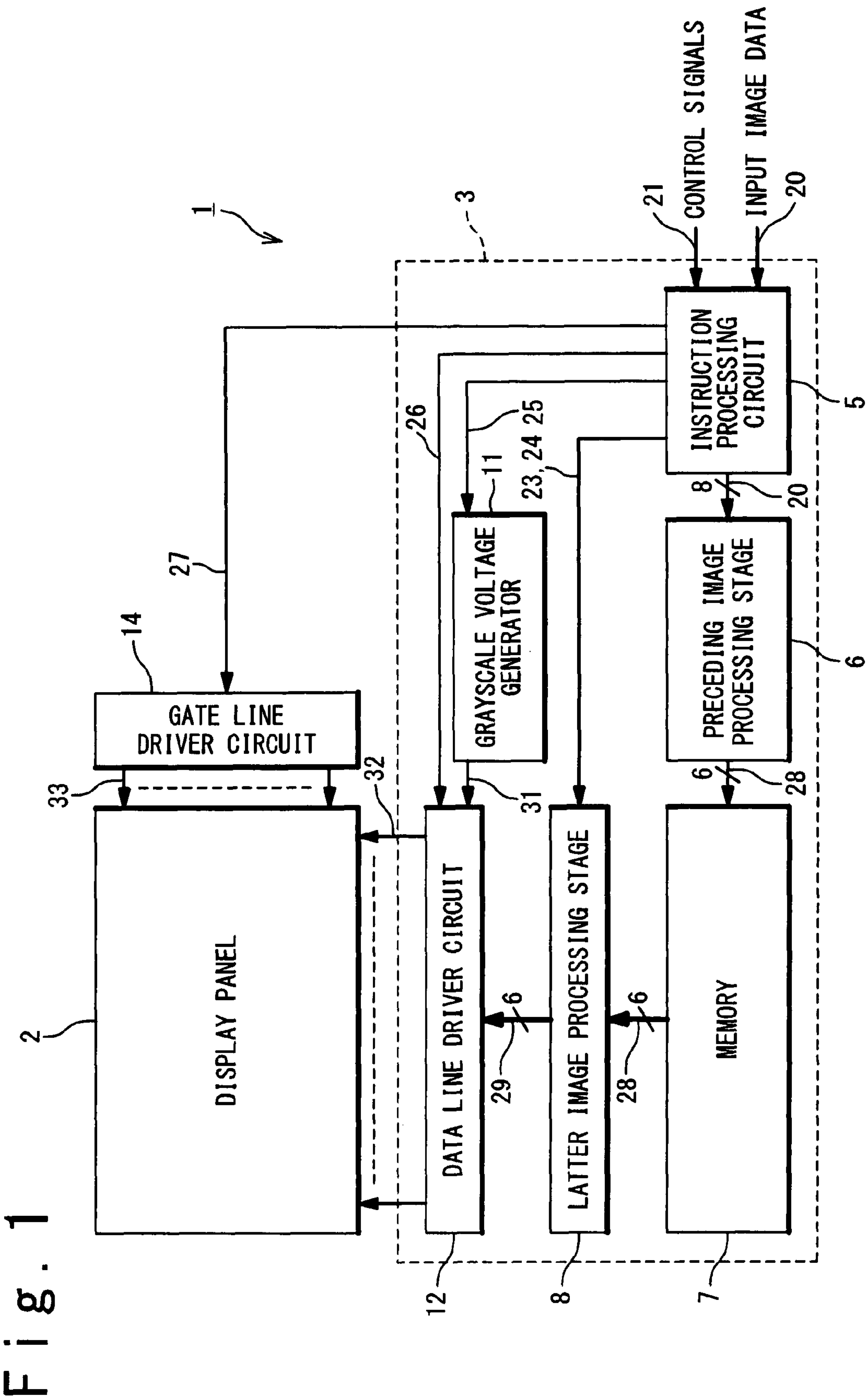
FIG. 1 is a block diagram showing a configuration of a display device in a first embodiment of the present invention.

In a first embodiment of the present invention, as shown in FIG. 1, a display device 1 is provided with a display panel 2 and a controller driver 3. In this embodiment, the display panel 2 is a liquid crystal panel which includes thereon a plurality of pixels arranged in rows and columns, a plurality of gate lines, and a plurality of data lines. In the operation of the controller driver 3, each pixel is identified by a pair of X and Y coordinates. Each pixel is connected with corresponding one of the gate lines and also connected with corresponding one of the data lines. The controller driver 3 drives the display panel 2 to display desired images in response to input image data 20 externally provided thereto.

The controller driver 3 includes an instruction processing circuit 5, a preceding image processing stage 6, a memory 7, a latter image processing stage 8, a grayscale voltage generator 11, a data line driver circuit 12 and a gate line driver circuit 14.

The instruction processing circuit 5 transfers the input image data 20 to the preceding image processing stage 6, and also controls the operation of the controller driver 3 in response to control signals 21 externally provided to the controller driver 3. In detail, the instruction processing circuit 5 generates coordinate data 23, a timing control signal 24, a grayscale level setting signal 25, a timing control signal 26 and a timing control signal 27, in response to the control signals 21.

The input image data 20 correspond to an image to be displayed on the display panel 2, indicating the grayscale levels of the respective pixels on the display panel 2. In this embodiment, the bit width of the input image data 20 is eight; the input image data 20 is comprised of a series of 8-bit data each indicating the grayscale level of the corresponding pixel.

The control signals 21 are used to provide settings to the grayscale voltage generator 11, indicating desired voltage levels of grayscale voltages to be generated by the grayscale voltage generator 11. The control signals 21 are also used to achieve the timing control of the data line driver circuit 12 and the gate line driver circuit 14, indicating the operation timings of the data line driver circuit 12 and the gate line driver circuit 14.

The coordinate data 23 are used to identify a target pixel, indicating the X and Y coordinates of the target pixel. The coordinate data 23 cyclically vary in synchronization with the data processing of the latter image processing stage 8 and the driving operation of the data driver circuit 12.

The timing control signal 24 indicates the timing for initiation of displaying each frame image to be displayed on the display panel 2. In one embodiment, the timing control signal 24 is generated in synchronization with the vertical sync signal Vsync.

The grayscale level setting signal 25 is responsive to the control signals 21 to indicate desired voltage levels of the grayscale voltages corresponding to the allowed grayscale levels.

The timing control signal 27 indicates the timing of scanning the gate lines of the display panel 2, allowing the gate line driver circuit 14 to drive the gate lines in appropriate timings. The timing control signal 26 indicates the timings at which the data line driver circuit 12 drives the data lines of the display panel 2.

The image processing preceding stage 6 performs 2-bit color-reduction processing on the input image data 20 to generate color-reduced image data 28. In this embodiment, the bit width of the generated color-reduced image data 28 is six; the color-reduced image data 28 are comprised of 6-bit data each indicating the grayscale level of the corresponding pixel. The image processing preceding stage 6 performs the color-reduction processing by using a dither matrix stored therein. Details of the color-reduction processing in this embodiment will be described later.

The memory 7 temporarily stores therein the color-reduced image data 28 received from the image processing preceding stage 6, and transfers the received color-reduced image data 28 to the image processing part latter state 8 in synchronization with the timing of driving the data lines.

Preferably, the capacity of the memory 7 is equal to the product of the bit width of the color-reduced image data 28 and the number of pixels disposed on the display panel 2. The capacity thus determined is enough to store the color-reduced image data 28 for one frame image.

The latter image processing stage 8 performs modification processing on the color-reduced image data 28 to generate output image data 29 in response to the coordinate data 23 and the timing control signal 24. The modification processing by the latter image processing stage 8 aims to reduce the granular unevenness and false colors within the displayed image with reduced flicker, and to thereby improve the image quality. In this embodiment, the bit width of the generated output image data 29 is six; the output image data 29 are comprised of a series of 6-bit data each indicating the grayscale level of the corresponding pixel. It should be noted that the bit width of the generated output image data 29 is equal to that of the color-reduced image data 28. The grayscale level indicated by the output image data 29 for a specific pixel is identical to that indicated by the color-reduced image data 28 for the specific pixel, or is identical to the grayscale level obtained by adding one to the grayscale level indicated by color-reduced image data 28 for the specific pixel. Details of the modification processing by the latter image processing stage 8 are described later.

The gate line driver circuit 14 sequentially outputs gate drive signals 33 onto the respective gate lines of the display panel 2 in synchronization with the timing control signal 27, to thereby sequentially activate the gate lines.

The data line driver circuit 12 outputs drive voltages 32 onto the respective data lines of the display panel 2 in response to the timing control 26 and the output image data 29. The voltage levels of the drive voltages 32 are each identical to selected one of the grayscale voltages 31 generated by the grayscale voltage generator 11. That is, the data line driver circuit 12 applies the drive voltage 32 corresponding to the grayscale levels indicated by the output image data 29 to the associated pixels at the timing indicated by the timing control signal 26.

The data line driver circuit 12 is adapted to frame inversion drive. The polarity of the drive voltage 32 applied to each pixel is inverted every frame period. For a specific pixel, for example, the polarity of the drive voltage 32 is positive in even-numbered frame periods, and is negative in odd-numbered frame periods.

The above-described operations of the data line driver circuit 12 and the gate line driver 14 allow the display panel 2 to display desired images. The brightness of the respective pixels are determined by the drive voltages 32, each having a voltage level selected from those of the grayscale voltages 31.

In the following, details of the preceding and latter image processing stages 6 and 8 are described with reference to FIGS. 2 and 3.

FIG. 2 shows an exemplary content of the dither matrix used in the color-reduction processing within the preceding image processing stage 6. The dither matrix, denoted by the numeral 51 in FIG. 2, describes the association of the X and Y coordinates of the target pixel to the threshold value used in the color-reduction processing. The threshold values described in the dither matrix 51 are selected from among 0, 1, 2, and 3. In FIG. 2, the values following the symbols “X” indicate the lower two bits of the X coordinates. More specifically, “X0” indicates such an X coordinate that the remainder is 0 when the X-coordinate is divided by 4, and “X1” indicates such an X coordinate that the remainder is 1 when the X-coordinate is divided by 4. Correspondingly, “X2” indicates such an X coordinate that the remainder is 2 when the X-coordinate is divided by 4, and “X3” indicates such an X coordinate that the remainder is 3 when the X-coordinate of a pixel is divided by 4.

The same goes for the Y-coordinate. “Y0” indicates such a Y coordinate that the remainder is 0 when the Y-coordinate is divided by 4, and “Y1” indicates such a Y coordinate that the remainder is 1 when the Y-coordinate is divided by 4. Correspondingly, “Y2” indicates such a Y coordinate that the remainder is 2 when the Y-coordinate is divided by 4. “Y3” indicates such a Y coordinate that the remainder of 3 when the Y-coordinate is divided by 4.

It should be noted that the frequencies in which the respective allowed threshold values of “0”, “1”, “2”, “3” appear in the dither matrix 51 are same; four “0”s, four “1”s, four “2”s and four “3”s appear in the dither matrix 51. Further, the dither matrix 51 is so designed that the threshold values associated with each X-coordinate consists of one “0”, one “1”, one “2” and one “3”. Correspondingly, the dither matrix 51 is so designed that the threshold values associated with each Y-coordinate consists of one “0”, one “1”, one “2” and one “3”.

The preceding image processing stage 6 performs well-known color-reduction processing by using the dither matrix 51 defined above. In one embodiment, the color-reduction processing by the preceding image processing stage 6 is expressed by the following equation:

$$Dred=(Din-Dth+2)>>2,$$

where Dred is the value of the color-reduced image data 28 for the target pixel, Din is the value of the input image data 20 for the target pixel, and Dth is the threshold value selected from the dither matrix 51 on the basis of the X and Y coordinates of the target pixel. The symbol “>>2” indicates the processing of discarding the lower two bits.

Figure 3:
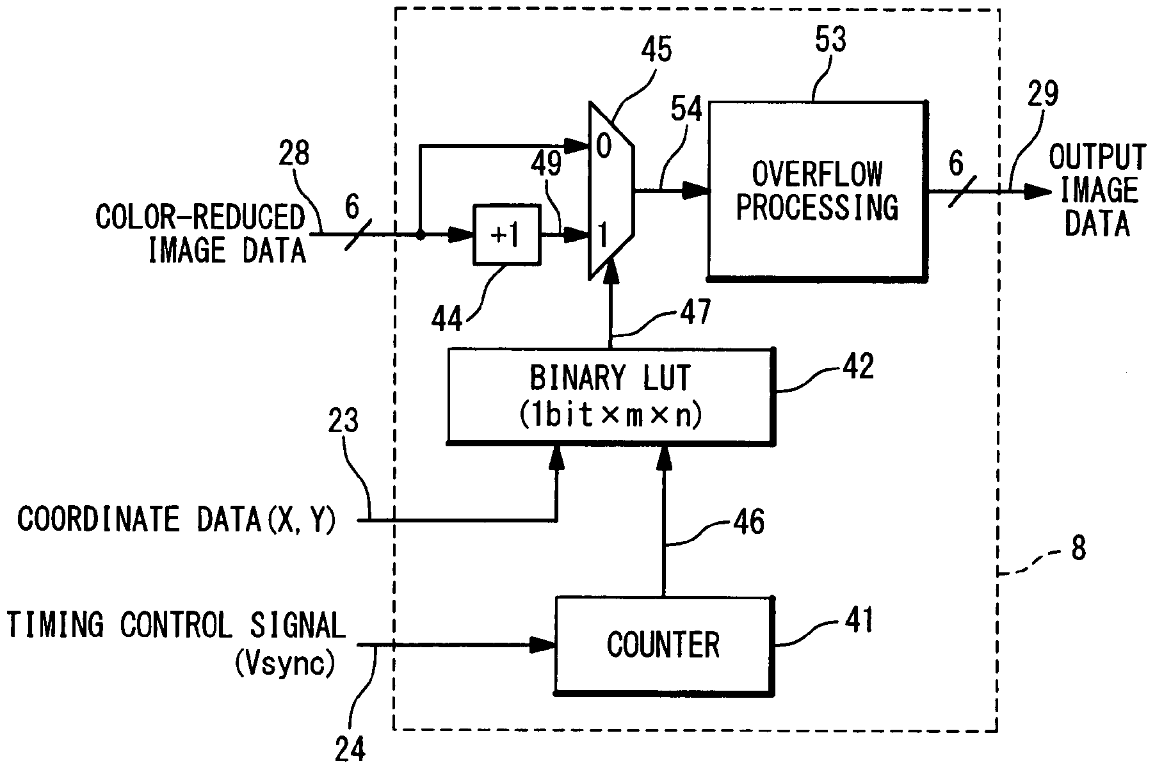
FIG. 3 is a block diagram showing a configuration of a latter image processing stage integrated within the display device shown in FIG. 1.

FIG. 3 shows an exemplary configuration of the latter image processing stage 8 in the first embodiment. In this embodiment, the latter image processing stage 8 is provided with a counter 41, a binary LUT 42, a +1 adder 44, a selector 45, and an overflow processing unit 53.

The counter 41 counts the activation of the timing control signal 24 to generate a Vsync counter value 46. The Vsync counter value 46 is allowed to be any of 0, 1, 2, and 3. The Vsync counter value 46 is updated every frame period, in response to the activation of the timing control signal 24; the Vsync counter value 46 is sequentially set to 0, to 1, to 2, to 3, to 1, to 2, to 3, and then to 0 in every eight frame periods in response to the timing control signal 24.

The binary LUT 42 is prepared in a storage device and designed to output an LUT output value 47 in response to the coordinate data 23 (that is, the X and Y coordinates of the target pixel) and the Vsync counter value 46. It should be noted that the LUT output value 47 is determined independently of the color-reduced image data 28. The LUT output value 47 is selected between 0 and 1.

The +1 adder 44 generates +1 image data 49 by adding 1 to the respective values of the color-reduced image data 28. The +1 image data 49 indicates the grayscale levels increased by one from those indicated the color-reduced image data 28 for the respective pixels.

The selector 45 selects the color-reduced image data 28 or the +1 image data 49 as selected image data 54, in response to the LUT output value 47. The value of the selected image data 54 is identical to the corresponding value of the color-reduced image data 28 when the LUT output value 47 is 0. When the LUT output value 47 is 1, on the other hand, the value of the selected image data 54 is identical to the value obtained by adding one to the corresponding value of the color-reduced image data 28.

The overflow processing unit 53 performs overflow processing on the selected image data 54 to generate the output image data 29 based on the image data 54. The value of the output image data 29 is identical to the corresponding value of the selected image data 54 when the image data 54 does not experience overflow. When the image data 54 experiences overflow, on the other hand, the value of the output image data 29 is set to the value of the color-reduced image data 28.

FIG. 4 shows an exemplary content of the binary LUT 42. The binary LUT 42 describes the association of the LUT output value 47 with the Vsync counter value 46 and the X and Y coordinates indicated by the coordinate data 23. In FIG. 4, as is the case of FIG. 2, "X0" indicates such an X coordinate that the remainder is 0 when the X-coordinate is divided by 4, and "X1" indicates such an X coordinate that the remainder is 1 when the X-coordinate is divided by 4. Correspondingly, "X2" indicates such an X coordinate that the remainder is 2 when the X-coordinate is divided by 4, and "X3" indicates such an X coordinate that the remainder is 3 when the X-coordinate of a pixel is divided by 4. The same goes for the Y-coordinate. "Y0" indicates such a Y coordinate that the remainder is 0 when the Y-coordinate is divided by 4, and "Y1" indicates such a Y coordinate that the remainder is 1 when the Y-coordinate is divided by 4. Correspondingly, "Y2" indicates such a Y coordinate that the remainder is 2 when the Y-coordinate is divided by 4. "Y3" indicates such a Y coordinate that the remainder of 3 when the Y-coordinate is divided by 4.

The binary values described in the binary LUT 42 are selected between 0 and 1. It should be noted that the binary LUT 42 is so designed that the total number of "1"s described in the binary LUT 42 for a specific pair of X and Y coordinates is identical to the threshold value identified by the specific pair of X and Y coordinates in the dither matrix 51 within the preceding image processing stage 6. For "X0" and "Y0", for example, the total number of the "1"s in the binary LUT 42 is two, while the threshold value described in the dither matrix 51 for "X0" and "Y0" (See FIG. 2) is "2".

Additionally, the binary LUT 42 is so designed that the total numbers of "1"s described in the binary LUT 42 for the respective allowed values of the Vsync counter value 46 are same; six "1"s appear in the binary LUT 42 for each allowed Vsync counter value (0, 1, 2 and 3).

The binary LUT 42 of the latter image processing stage 8 outputs the LUT output value 47 as identified by the Vsync counter value 46 and the X and Y coordinates indicated by the coordinate data 23. As a result, the latter image processing stage 8 performs processing expressed by the following equation:

$$D\text{out} = D\text{red} + D_{LUT},$$

where Dred is the color-reduced image data 28 received from the memory 7 and $D_{LUT}$ is the LUT output value 47 obtained from the binary LUT 42.

Therefore, the entire processing performed by the preceding and latter image processing stages 6 and 8 is expressed by the following equation:

$$D\text{out} = \{(D\text{in} - D\text{th} + 2) >> 2\} + D_{LUT}.$$

It should be noted that the sum of the LUT output values described in the binary LUT 42 for a specific pair of X and Y coordinates over all the allowed values of the Vsync counter value 46 (0, 1, 2 and 3) is equal to the threshold value described for the specific pair of X and Y coordinates in the dither matrix 51 prepared in the preceding image processing stage 6.

An example of the operations of the preceding and latter image processing stages 6 and 8 is given in the following. When the input image data 20 for 4×4 target pixels are given as shown in Table 1, the color-reduced image data 28 for the 4×4 target pixels are obtained as shown in Table 2:

TABLE 1

$$\begin{bmatrix} 16 & 17 & 18 & 19 \\ 16 & 17 & 18 & 19 \\ 16 & 17 & 18 & 19 \\ 16 & 17 & 18 & 19 \end{bmatrix}$$

TABLE 2

$$\begin{bmatrix} 16+0 & 17+1 & 18+2 & 19-1 \\ 16+2 & 17-1 & 18+0 & 19+1 \\ 16-1 & 17+2 & 18+1 & 19+0 \\ 16+1 & 17+0 & 18-1 & 19+2 \end{bmatrix} /4 = \begin{bmatrix} 4 & 4 & 5 & 4 \\ 4 & 4 & 4 & 5 \\ 3 & 4 & 4 & 4 \\ 4 & 4 & 4 & 5 \end{bmatrix}.$$

The values of the output image data 29 for the 4×4 target pixels depend on the Vsync counter value 46. For a frame period in which the Vsync counter value 46 is set to 0, the output image data 29 are obtained as shown in Table 3:

TABLE 3

$$\begin{bmatrix} 5 & 4 & 5 & 5 \\ 4 & 5 & 5 & 5 \\ 3 & 4 & 4 & 4 \\ 5 & 4 & 5 & 5 \end{bmatrix}$$

Correspondingly, for frame periods in which the Vsync counter value 46 is set to 1, 2, and 3, the output image data 29 are obtained as shown in Tables 4 to 6, respectively:

TABLE 4

$$\begin{bmatrix} 4 & 4 & 5 & 5 \\ 4 & 5 & 4 & 5 \\ 4 & 4 & 5 & 5 \\ 4 & 5 & 4 & 5 \end{bmatrix}$$

TABLE 5

$$\begin{bmatrix} 5 & 4 & 5 & 4 \\ 4 & 5 & 5 & 6 \\ 4 & 4 & 4 & 4 \\ 4 & 4 & 5 & 5 \end{bmatrix}$$

TABLE 6

$$\begin{bmatrix} 4 & 5 & 5 & 5 \\ 4 & 4 & 4 & 5 \\ 4 & 4 & 4 & 4 \\ 4 & 5 & 5 & 5 \end{bmatrix}$$

The following Table 7 indicates the sums of the values of the output image data 29 for the respective 4×4 target pixels over these four frame periods:

TABLE 7

$$\begin{bmatrix} 18 & 17 & 20 & 19 \\ 16 & 19 & 18 & 21 \\ 15 & 16 & 17 & 18 \\ 17 & 18 & 19 & 20 \end{bmatrix}$$

As is understood from Table 7, the processing performed within the display device in this embodiment allows the output image data 29 to accurately follow the input image data 20 as a whole. This implies that that the processing performed in this embodiment effectively reduces granular unevenness and false colors.

The above-described architecture of the controller driver 3 only requires the memory 7, the latter image processing stage 8, the grayscale voltage generator 11, and the data line driver circuit 12 to be adapted to six-bit processing, allowing the reduction the circuit sizes of these circuits.

In the following, an exemplary overall operation of the display device 1 of this embodiment is described in detail.

The input image data 20 and the control signals 21 are externally provided to the controller driver 3. The instruction processing circuit 5 transfers the input image data 20 to the preceding image processing stage 6, and also generates the coordinate data 23, the timing control signal 24, the gradation setting 25, the timing control 26, and the timing control 27 in response to the input image data 20 and the control signal 21. The preceding image processing stage 6 generates the color-reduced image data 28 by performing the two-bit color-reduction processing on the input image data 20. The memory 7 temporarily stores the color-reduced image data 28, and then transfers the color-reduced image data 28 to the latter image processing stage 8 at the timing of driving pixels associate with the color-reduced image data 28.

The counter 41 feeds the Vsync counter value 46 to the binary LUT 42. The Vsync counter value 46 is cyclically set to 0, to 1, to 2, to 3, to 1, to 2, to 3 and then to 0 at the timings indicated by the timing control signal 24 in every eight frame periods. The binary LUT 42 outputs the LUT output value 47 as indicated by the coordinate data 23 and the counter value 46. The +1 adder 44 generates the +1 image data 49 by adding one to the respective values of the color-reduced image data 28. The selector 45 selects the color-reduced image data 28 as the selected image data 54, when the LUT output value 47 is 0, while selecting the +1 image data 49 as the selected image data 54 when the LUT output value 47 indicates 1. The overflow processing unit 53 generates the output image data 29 from the selected image data 54. The value of the output image data 29 is identical to the corresponding value of the selected image data 54 when the selected image data 54 does not experience overflow. When the selected image data 54 experiences overflow on the other hand, the value of the output image data 29 is set to a value identical to the corresponding value of the color-reduced image data 28.

The grayscale voltage generator 11 feeds the grayscale voltages 31 to the data-line driving circuit 12 in response to the grayscale level setting signal 25. The gate driving circuit 14 activates a selected gate line of the display panel 2 in response to the timing control 27, deactivating the remaining gate lines. The data line driver circuit 12 feeds drive voltages 32 selected from the grayscale voltages 31 in response to the grayscale levels indicated by the output image data 29 to the data lines of the display panel 2 at the timing indicated by the timing control 26. This results in that the drive voltages 32 are applied to a line of pixels associated with the selected gate line, respectively. The above-described operations allow the display panel 2 to display a desired image according to the input image data 20.

As thus described, the display device 1 of the first embodiment is designed to generate four different frame images for a single image corresponding to the input image data 20 while the Vsync counter value 46 are sequentially updated to the allowed four values during the series of four frame periods; it should be noted that the allowed four counter values are respectively associated with the four different frame images displayed on the display panel 2.

The above-described operation allows virtually displaying 8-bit images on the display panel 2 with improved image quality by using the memory 7, the grayscale voltage generator 11, and the data line driver circuit 12, which are only adapted to 6-bit image data.

Taking the image processor 100 disclosed in the aforementioned '272 application as a comparative example, various advantages of the display device 1 of the present embodiment will be described in the following.

FIG. 10 shows the value of the carry outputted from the carry generator 120 when the threshold value generator 111B generates the threshold value as shown in FIG. 9. The frequencies of "1"s appearing in the generated carry are different among the allowed Vsync counter values (0, 1, 2 and 3). The carry is never set to the value of "1" for the 4×4 target pixels in a frame period during which the Vsync counter value is set to 0, while the carry is set to the value of "1" twelve times for the 4×4 target pixels in a frame period during which the Vsync counter value is set to 3. On the other hand, the carry is set to the value of "1" four times for the 4×4 target pixels in a frame period during which the Vsync counter value is set to 1, and the carry is set to the value of "1" eight times for the 4×4 target pixels in a frame period during which the Vsync counter value is set to 2. For the case that the "0" grayscale level indicates the darkest brightness, the average brightness of the frame image in a specific frame period is increased as the frequency of the carry being set to "1" during the specific frame period is increased. Therefore, the conventional image processor 100 suffers from flickers, repeatedly displaying the frame images with different average brightnesses, in response to the update of the Vsync counter value.

In the display device 1 of this embodiment, on the other hand, the frequency of the LUT output value 47 being set to the value of "1" is fixed to a constant value for every frame period (for every allowed Vsync counter value); the frequency of the grayscale level being increased by one in the output image data 29 is constant. Therefore, the display device 1 effectively reduces the change in the average brightness of four frame images generated from the same input image data 20, compared with the conventional image processor 100, thereby reducing the flicker in successively displaying the four frame images.

In addition, the above-described operation of the display device 1 effectively reduces the offset in the average of the voltage level of the drive voltage 32 applied to each pixel of the display panel 2. Such advantage results from the fact that the Vsync counter value 46 is cyclically updated so that the polarities of the drive voltages 32 for the respective pixels are opposite in every two neighboring frame periods for the same Vsync counter value 46; specifically, the Vsync counter value 46 is sequentially set to 0, to 1, to 2, to 3, to 1, to 2, to 3 and then to 0 in the first eight frame periods, and the same goes for the following frame periods in this embodiment.

In an alternative embodiment, the counter 41 may be designed so that the Vsync counter value 46 is repeatedly set to 0, to 1, to 2, to 3 at the timings indicated by the timing control signal 24 in the first four frame periods, and then the same goes for the following frame periods. In this case, the display device 1 drives the respective pixels with the drive voltages 32 of the same polarity during the frame periods associated with the same Vsync counter value 46, in synchronization with the polarity inversion in driving the display panel 2. Although not reducing the offset in the average of the voltage level of the drive voltage 32 applied to each pixel, such architecture of the display device 1 effectively reduces the flicker.

Second Embodiment

Figure 5:
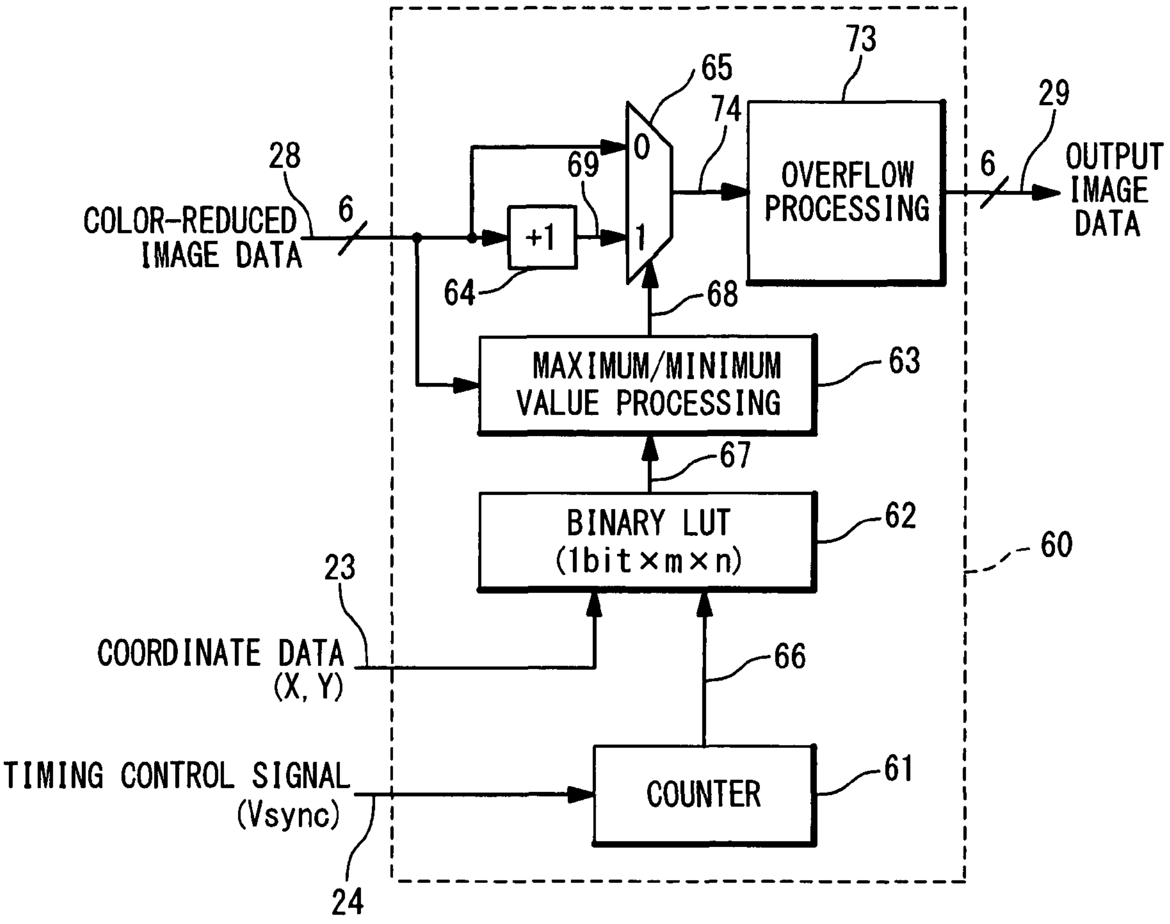
FIG. 5 is a block diagram showing a configuration of a latter image processing stage in a second embodiment of the present invention.
Figure 8:
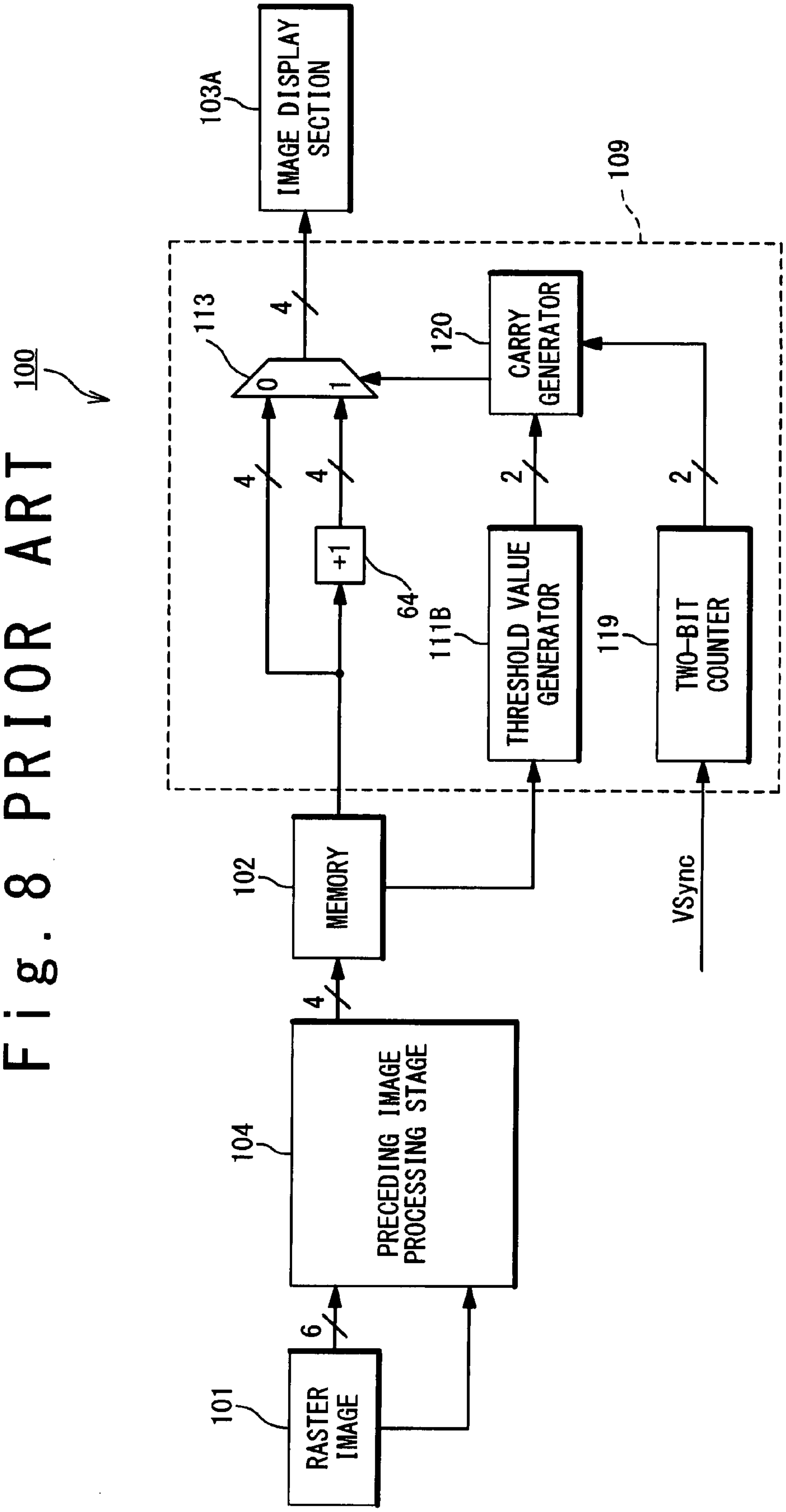
Fig. 8 PRIOR ART
FIG. 8 is a block diagram showing the configuration of a conventional image processor.

In a second embodiment, as shown in FIG. 5, the latter image processing stage 8 of the display device 1 is replaced with another latter image processing stage 60, which is designed differently from the latter image processing stage 8 in the first embodiment. The latter image processing stage 60 is designed to address a drawback of the latter image processing stage 8 as follows: One issue is that of the latter image processing stage 8 is designed to always perform the modification processing for adding one to the value of the color-reduced image data 28, even when the value of color-reduced image data 28 is all-0 or all-1; it should be noted that all-0 indicates the pure black and all-1 indicates the pure white. This undesirably results in that non-black dots appear in the pure-black background and non-white dots appear in the pure-white background. The architecture of the latter image processing stage 60 effectively resolves this problem. In the following, a description is given of the latter image processing stage 60 in detail.

The latter image processing stage 60 is provided with a counter 61, a binary LUT 62, a maximum/minimum value processing unit 63, a +1 computing device 64, a selector 65, and an overflow processing unit 73.

The counter 61 counts the activation of the timing control signal 24 to generate a Vsync counter value 66. The Vsync counter value 66 is sequentially set to 0, to 1, to 2, to 3, to 1, to 2, to 3, and then to 0 in every eight frame periods in response to the timing control signal 24.

The binary LUT 62 is prepared in a storage device to output an LUT output value 67 as indicated by the coordinate data 23 (that is, the X and Y coordinates of the target pixel) and the Vsync counter value 66. The contents of the binary LUT 62 are same as those of the binary LUT 42 in the first embodiment.

The maximum/minimum value processing unit 63, which is one main feature in the second embodiment, determines the output value thereof (denoted by the numeral 68 in FIG. 5) on the basis of the LUT output value 67 and the color indicated by the color-reduced image data 28. In detail, when the value of the color-reduced image data 28 is all-0 (pure black, for example) or all-1 (pure white, for example), the maximum/minimum value processing unit 63 sets the output value 68 to 0, independently of the LUT output value 67; otherwise, the maximum/minimum value processing unit 63 sets the output value 68 to the value identical to the LUT output value 67.

The +1 adder 64 generates +1 image data 69 by adding 1 to the respective values of the color-reduced image data 28. The +1 image data 69 indicates the grayscale levels increased by one from those indicated the color-reduced image data 28 for the respective pixels.

The selector 65 selects the color-reduced image data 28 or the +1 image data 69 as selected image data 74, in response to the LUT output value 67. The value of the selected image data 74 is identical to that of the color-reduced image data 28 when the LUT output value 67 is 0. When the LUT output value 67 is 1, on the other hand, the value of the selected image data 74 is identical to the value obtained by adding one to the value of the color-reduced image data 28.

The overflow processing unit 73 performs overflow processing on the selected image data 74 to generate the output image data 29 based on the image data 74. The value of the output image data 29 is identical to that of the selected image data 74 when the image data 74 does not experience overflow. When the image data 74 experiences overflow, on the other hand, the value of the output image data 29 is set to the value of the color-reduced image data 28.

As is the case of the controller driver 3 described in the first embodiment, the above-described variation only requires the memory 7, the latter image processing stage 8, the grayscale voltage generator 11, and the data line driver circuit 12 to be adapted to six-bit processing, allowing the reduction the circuit sizes of these circuits.

The operation of the controller driver 3 in the second embodiment is similar to that in the first embodiment, except for the use of the maximum/minimum value processing unit 63.

The input image data 20 and the control signals 21 are externally provided to the controller driver 3. The instruction processing circuit 5 transfers the input image data 20 to the preceding image processing stage 6, and also generates the coordinate data 23, the timing control signal 24, the gradation setting 25, the timing control 26, and the timing control 27 in response to the input image data 20 and the control signal 21. The preceding image processing stage 6 generates the color-reduced image data 28 by performing the two-bit color-reduction processing on the input image data 20. The memory 7 temporarily stores the color-reduced image data 28, and then transfers the color-reduced image data 28 to the latter image processing stage 8 at the timing of driving pixels associate with the color-reduced image data 28.

The counter 61 feeds the Vsync counter value 66 to the binary LUT 62. The Vsync counter value 66 is cyclically set to 0, to 1, to 2, to 3, to 1, to 2, to 3 and then to 0 at the timings indicated by the timing control signal 24 in every eight frame periods. The binary LUT 62 outputs the LUT output value 67 as indicated by the coordinate data 23 and the counter value 66.

The maximum/minimum value processing unit 63 determines the output value 68 on the basis of the LUT output value 67 and the color indicated by the color-reduced image data 28. In detail, when the value of the color-reduced image data 28 is all-0 (pure black, for example) or all-1 (pure white, for example), the maximum/minimum value processing unit 63 sets the output value 68 to 0, independently of the LUT output value 67; otherwise, the maximum/minimum value processing unit 63 sets the output value 68 to the value identical to the LUT output value 67.

The +1 adder 64 generates the +1 image data 69 by adding one to the respective values of the color-reduced image data 28. The selector 65 selects the color-reduced image data 28 as the selected image data 74, when the LUT output value 67 is 0, while selecting the +1 image data 69 as the selected image data 74 when the LUT output value 67 indicates 1. The overflow processing unit 73 generates the output image data 29 from the selected image data 74. The value of the output image data 29 is identical to that of the selected image data 74 when the selected image data 74 does not experience overflow. When the selected image data 74 experiences overflow on the other hand, the value of the output image data 29 is set to a value identical to the value of the color-reduced image data 28.

The grayscale voltage generator 11 feeds grayscale voltages 31 to the data-line driving circuit 12 in response to the grayscale level setting signal 25. The gate driving circuit 14 activates a selected gate line of the display panel 2 in response to the timing control 27, deactivating the remaining gate lines. The data line driver circuit 12 feeds drive voltages 32 selected from the grayscale voltages 31 in response to the grayscale levels indicated by the output image data 29 to the data lines of the display panel 2 at the timing indicated by the timing control 26. This results in that the drive voltages 32 are applied to a line of pixels associated with the selected gate line, respectively. The above-described operations allow the display panel 2 to display a desired image according to the input image data 20.

As is the case of the display device 1 of the first embodiment, the display device of the second embodiment also reduces the flicker, while reducing the offset in the average of the voltage level of the drive voltage 32 applied to each pixel of the display panel 2.

Additionally, the use of the latter image processing stage 60 effectively avoids the above-mentioned drawback of the latter image processing stage 8. As described above, the latter image processing stage 8 suffers from the drawback that non-black dots appear in the pure black background and non-white dots appear in the pure white background. On the other hand, the latter image processing stage 60 unconditionally sets the value of the output image data 29 to all-0, when the corresponding value of the color-reduced image data 28 is all-0, and also unconditionally sets the value of the output image data 29 to all-1 when the corresponding value of the color-reduced image data 28 is all-1. This effectively avoids non-black dots appearing in the pure-black background, and also avoids non-white dots appearing in the pure-white background.

In an alternative embodiment, the maximum/minimum value processing unit 63 may be configured to set the output value 68 to 0 when the value of the color-reduced image data 28 is all-0, to set the output value 68 to 1 when the value of the color-reduced image data 28 is all-1, and to set the output value 68 to the value identical to the LUT output value 67. Such configuration also avoids non-black dots appearing in the pure-black background, and also avoids non-white dots appearing in the pure-white background.

Third Embodiment

In a third embodiment of the present invention, the operation of the grayscale voltage generator 11 is modified from that in the first embodiment. The grayscale voltage generator 11 of the third embodiment generates a set of grayscale voltages 31 so that the voltage level of the grayscale voltage 31 generated for a specific grayscale level by the grayscale voltage generator 11 of the third embodiment is identical to that of the grayscale voltage 31 generated for the grayscale level increased by one from the specific grayscale level by the grayscale voltage generator 11 of in the first embodiment. More specifically, the grayscale voltages 31 are generated in the third embodiment so that the following equations hold:

$$V_0'=V_1,$$

$$V_1'=V_2,$$

$$\ldots$$

$$V_{n-1}'=V_n, \text{ and}$$

$$V_n'=V_{n+1},$$

where n is the total number of the grayscale voltages 31, $V_i'$ is the voltage level of the grayscale voltage corresponding to a grayscale level of i generated in the third embodiment, $V_i$ is the voltage level of the grayscale voltage corresponding to a grayscale level of i generated in the first embodiment, and $V_{n+1}$ is a voltage level slightly higher than the voltage level of the grayscale voltage corresponding to a grayscale level of n generated in the first embodiment. Hereinafter, such-generated grayscale voltages 31 are referred to as the +1 grayscale voltages 31.

In this embodiment, the dither matrix used in the preceding image processing stage 6, and the binary LUT used in the latter image processing stage 8 are modified as follows:

FIG. 6 shows an exemplary content of the dither matrix used in the preceding image processing stage 6 in this embodiment (which matrix is referred to as the dither matrix 71, hereinafter). The dither matrix 71 describes the association of the X and Y coordinates of the target pixel to the threshold value used in the color-reduction processing. In FIG. 6, "X0" indicates such an X coordinate that the remainder is 0 when the X-coordinate is divided by 4, and "X1" indicates such an X coordinate that the remainder is 1 when the X-coordinate is divided by 4. Correspondingly, "X2" indicates such an X coordinate that the remainder is 2 when the X-coordinate is divided by 4, and "X3" indicates such an X coordinate that the remainder is 3 when the X-coordinate of a pixel is divided by 4. The same goes for the Y-coordinate. "Y0" indicates such a Y coordinate that the remainder is 0 when the Y-coordinate is divided by 4, and "Y1" indicates such a Y coordinate that the remainder is 1 when the Y-coordinate is divided by 4. Correspondingly, "Y2" indicates such a Y coordinate that the remainder is 2 when the Y-coordinate is divided by 4. "Y3" indicates such a Y coordinate that the remainder of 3 when the Y-coordinate is divided by 4.

It should be noted that the threshold values described in the dither matrix 71 are selected between 1 and 3 in the third embodiment, while the threshold values described in the dither matrix 51 are selected from among 0, 1, 2 and 3 in the first embodiment.

It should be also noted that, differently from the first embodiment, the frequencies in which the allowed threshold values of "0", "1", "2", "3" appear in the dither matrix 71 are not constant in the third embodiment; eight "1"s and eight "3"s appear in the dither matrix 71, and no "0" and "2" appear in the dither matrix 71.

FIG. 7 shows an exemplary content of the binary LUT 42 integrated within the latter image processing stage 8 in the third embodiment.

As described above, the binary LUT 42 describes the association of the LUT output value with the Vsync counter value 46 and the X and Y coordinates indicated by the coordinate data 23. In FIG. 7, as is the case of FIG. 6, "X0" indicates such an X coordinate that the remainder is 0 when the X-coordinate is divided by 4, and "X1" indicates such an X coordinate that the remainder is 1 when the X-coordinate is divided by 4. Correspondingly, "X2" indicates such an X coordinate that the remainder is 2 when the X-coordinate is divided by 4, and "X3" indicates such an X coordinate that the remainder is 3 when the X-coordinate of a pixel is divided by 4. The same goes for the Y-coordinate. "Y0" indicates such a Y coordinate that the remainder is 0 when the Y-coordinate is divided by 4, and "Y1" indicates such a Y coordinate that the remainder is 1 when the Y-coordinate is divided by 4. Correspondingly, "Y2" indicates such a Y coordinate that the remainder is 2 when the Y-coordinate is divided by 4. "Y3" indicates such a Y coordinate that the remainder of 3 when the Y-coordinate is divided by 4.

In the third embodiment, the binary LUT 42 is so designed that the total number of "1"s described in the binary LUT 42 for a specific pair of X and Y coordinates is identical to the threshold value decreased by one, the threshold value being identified by the specific pair of X and Y coordinates in the dither matrix 71 within the preceding image processing stage 6. For "X1" and "Y0", for example, the total number of the "1"s in the binary LUT 42 is two, while the threshold value described in the dither matrix 51 for "X0" and "Y0" (See FIG. 6) is "3".

This fact implies that the grayscale level of each respective pixel indicated by the output image data 29 is decreased by one on an average from the desired grayscale level of the output image data 29 originally corresponding to the color-reduced image data 28; however, this causes no problem because the voltage level of the grayscale voltage 31 generated for a specific grayscale level by the grayscale voltage generator 11 of the third embodiment is identical to that of the grayscale voltage 31 generated for the grayscale level increased by one from the specific grayscale level by the grayscale voltage generator 11 of in the first embodiment.

Additionally, the binary LUT 42 of the third embodiment is so designed that the total numbers of "1"s described in the binary LUT 42 for the respective allowed values of the Vsync counter value 46 are same; four "1"s appear in the binary LUT 42 for each allowed Vsync counter value (0, 1, 2 and 3).

Furthermore, the binary LUT 42 of the third embodiment is so designed that the LUT output values 47 associated with the respective X and Y coordinates for the Vsync counter value 46 of "0" are the corresponding LUT output values 47 for the Vsync counter value 46 of "2", while the LUT output values 47 associated with the respective X and Y coordinates for the Vsync counter value 46 of "1" are the corresponding LUT output values 47 for the Vsync counter value 46 of "3".

As is the case of the controller driver 3 described in the first embodiment, the above-described variation only requires the memory 7, the latter image processing stage 8, the grayscale voltage generator 11, and the data line driver circuit 12 to be adapted to six-bit processing, allowing the reduction the circuit sizes of these circuits.

The operation of the controller driver 3 in the third embodiment is similar to that in the first embodiment, except for the voltage levels of the generated grayscale voltages 31 and the contents of the dither matrix used in the preceding image processing stage 6 and the binary LUT 42 used in the latter image processing stage 8.

More specifically, the input image data 20 and the control signals 21 are externally provided to the controller driver 3. The instruction processing circuit 5 transfers the input image data 20 to the preceding image processing stage 6, and also generates the coordinate data 23, the timing control signal 24, the gradation setting 25, the timing control 26, and the timing control 27 in response to the input image data 20 and the control signal 21. The preceding image processing stage 6 generates the color-reduced image data 28 by performing the two-bit color-reduction processing on the input image data 20. It should be noted that the dither matrix 71 shown in FIG. 6 is used in the two-bit color-reduction processing. The memory 7 temporarily stores the color-reduced image data 28, and then transfers the color-reduced image data 28 to the latter image processing stage 8 at the timing of driving pixels associate with the color-reduced image data 28.

The counter 41 feeds the Vsync counter value 46 to the binary LUT 42. The Vsync counter value 46 is cyclically set to 0, to 1, to 2, to 3, to 1, to 2, to 3 and then to 0 at the timings indicated by the timing control signal 24 in every eight frame periods. The binary LUT 42 outputs the LUT output value 47 as indicated by the coordinate data 23 and the Vsync counter value 46. It should be noted that the contents of the binary LUT 42 are as shown in FIG. 7 in this embodiment. The +1 adder 44 generates the +1 image data 49 by adding one to the respective values of the color-reduced image data 28. The selector 45 selects the color-reduced image data 28 as the selected image data 54, when the LUT output value 47 is 0, while selecting the +1 image data 49 as the selected image data 54 when the LUT output value 47 indicates 1. The overflow processing unit 53 generates the output image data 29 from the selected image data 54. The value of the output image data 29 is identical to that of the selected image data 54 when the selected image data 54 does not experience overflow. When the selected image data 54 experiences overflow on the other hand, the value of the output image data 29 is set to a value identical to the value of the color-reduced image data 28.

The grayscale voltage generator 11 feeds the +1 grayscale voltages 31 to the data-line driving circuit 12 in response to the grayscale level setting signal 25. The gate driving circuit 14 activates a selected gate line of the display panel 2 in response to the timing control 27, deactivating the remaining gate lines. The data line driver circuit 12 applies grayscale voltages selected from the +1 grayscale voltages 31 in response to the grayscale levels indicated by the output image data 29 to the data lines of the display panel 2 at the timing indicated by the timing control 26. The above-described operations allow the display panel 2 to display a desired image according to the input image data 20.

The above-described operation allows virtually displaying 8-bit images on the display panel 2 with improved image quality by using the memory 7, the grayscale voltage generator 11, and the data line driver circuit 12, which are only adapted to 6-bit image data.

In the above-described operation of the controller driver 3, the grayscale levels indicated by the output image data 29 are decreased by one on an average from the desired grayscale levels to be indicated by the output-image data 29 in accordance with the color-reduced image data 28, while the +1 grayscale voltage 31 are generated by the grayscale voltage generator 11. As a result, the drive voltages 32 are applied to the respective pixels as indicated by the color-reduced image data 28. One advantage of such operation is reduction in the flicker. The settings of the dither matrix 71, the binary LUT 42, and the +1 grayscale voltages 31 allow implementing an FRC technique with a cycle of two frame periods in this embodiment, instead of the FRC technique with a cycle of four frame periods implemented in the first embodiment. The reduction of the cycle of the frame rate control effectively reduces the flicker.

It is apparent that the present invention is not limited to the above embodiments, but may be modified and changed without departing from the scope of the invention.

In one embodiment, for example, the format of the input image data 20 may be changeable. In this case, the instruction processing circuit 5 may be designed to control the operations of the preceding and latter image processing stages 6 and 8 in response to the format of the input image data 20. More specifically, when the total number of bits of the input image data 20 for one frame image is larger than the capacity of the memory 7, the instruction processing circuit 5 allows the preceding and latter image processing stages 6 and 8 to operate as described above. When the total number of bits of the input image data 20 for one frame image is equal to or less than the capacity of the memory 7, on the other hand, the instruction processing circuit 5 prohibits the preceding and latter image processing stages 6 and 8 from performing the color-reduction processing and the modification processing. In this case, the preceding image processing stage 6 transfers the input image data 20 to the memory 7 instead of the color-reduced image data 28, and the memory 7 stores therein the input image data 20. The latter image processing stage 8 receives the input image data 20 from the memory 7 and transfers the received input image data 20 to the data line driver circuit 12.

In another embodiment, the instruction processing circuit 5 may be designed to control the operations of the preceding and latter image processing stages 6 and 8 in response to the bit width of the input image data 20. More specifically, when the bit width of the input image data 20 is larger than that of the color-reduced image data 28 (and that of the output image data 29), the instruction processing circuit 5 allows the preceding and latter image processing stages 6 and 8 to operate as described above. When the bit width of bits of the input image data 20 is equal to or less than that of the color-reduced image data 28, on the other hand, the instruction processing circuit 5 prohibits the preceding and latter image processing stages 6 and 8 from performing the color-reduction processing and the modification processing. In this case, the preceding image processing stage 6 transfers the input image data 20 to the memory 7 instead of the color-reduced image data 28, and the memory 7 stores therein the input image data 20. The latter image processing stage 8 receives the input image data 20 from the memory 7 and transfers the received input image data 20 to the data line driver circuit 12.

What is claimed is:

1. A display device comprising:

a display panel on which a plurality of pixels are provided; and a controller driver driving said display panel in response to input image data, said controller driver including:

a preceding image processing stage adapted to perform a color-reduction processing on said input image data by using a dither matrix to generate color-reduced image data;

a memory adapted to store said color-reduced image data;

a latter image processing stage adapted to perform a modification processing on said color-reduced image data received from said memory to generate output image data; and a driver circuit driving said display panel in response to said output image data, wherein said latter image processing stage comprises:

a counter generating a counter value such that said counter value is updated every frame period;

a binary LUT (lookup table) outputting an LUT output value in response to said counter value and coordinates of a target pixel selected from said plurality of pixels, independent of the color reduced image data; and a selector section generating said output image data from said color-reduced image data in response to said LUT output value, wherein a bit width of said output image data is identical to that of said color-reduced image data, and wherein a value of said output image data is identical to a corresponding value of said color-reduced image data when said LUT output value is a first value, while said value of said output image data is modified from said corresponding value of said color-reduced image data when said LUT output value is a second value different from said first value.

2. The display device according to claim 1, wherein total numbers of said first values described in said binary LUT for respective allowed values of said counter value are same.

3. The display device according to claim 1, wherein a capacity of said memory is equal to a product of said bit width of said color-reduced image data and a number of said pixels provided on said display panel.

4. The display device according to claim 2, wherein said latter image processing stage further comprises a maximum/minimum value processing unit outputting an output value selected from said LUT output value and said second value, in response to said color-reduced image data, wherein said selector section outputs said output image data in response to said output value of said maximum/minimum value processing unit, and wherein said maximum/minimum value processing unit sets said output value thereof to said second value when said corresponding value of said color-reduced image data is all-0 or all-1, and sets said output value thereof to said LUT output value when said corresponding value of said color-reduced image data is neither all-0 nor all-1.

5. The display device according to claim 2, wherein said controller driver further includes a drive circuit applying drive voltages a selected line of pixels, respectively, in response to said output image data, wherein polarities of said drive voltages are inverted every frame period, and wherein said counter outputs said counter value so that said polarities of said drive voltages applied to said selected line of pixels are opposite in every two neighboring frame periods in which said counter values generated therein are same.

6. The display device according to claim 1, wherein said controller driver is configured such that said preceding image processing stage performs said color-reduction processing and said latter image processing stage performs said modification processing, when a total number of said input image data for one frame image is larger than a capacity of said memory, and that said preceding image processing stage transfers said input image data to said memory and said latter image processing stage transfers said input image data from said memory to said driver circuit, when said total number of said input image data for one frame image is equal to or less than said capacity of said memory.

7. A controller driver for driving a display panel on which a plurality of pixels are provided, the controller driver comprising:

a preceding image processing stage adapted to perform color-reduction processing on input image data by using a dither matrix to generate color-reduced image data;

a memory adapted to store said color-reduced image data;

a latter image processing stage adapted to perform modification processing on said color-reduced image data received from said memory to generate output image data; and a driver circuit driving said display panel in response to said output image data, wherein said latter image processing stage includes:

a counter generating a counter value such that said counter value is updated every frame period;

a binary LUT (lookup table) outputting an LUT output value in response to said counter value and coordinates of a target pixel selected from said plurality of pixels, independent of the color reduced image data; and a selector section generating said output image data from said color-reduced image data in response to said LUT output value, wherein a bit width of said output image data is identical to that of said color-reduced image data, and wherein a value of said output image data is identical to a corresponding value of said color-reduced image data when said LUT output value is a first value, while said value of said output image data is modified from said corresponding value of said color-reduced image data when said LUT output value is a second value different from said first value.

8. The controller driver according to claim 7, wherein total numbers of said first values described in said binary LUT for respective allowed values of said counter value are same.

9. The controller driver according to claim 8, wherein said latter image processing stage further includes a maximum/minimum value processing unit outputting an output value selected from said LUT output value and said second value, in response to said color-reduced image data, wherein said selector section outputs said output image data in response to said output value of said maximum/minimum value processing unit, and wherein said maximum/minimum value processing unit sets said output value thereof to said second value when said corresponding value of said color-reduced image data is all-0 or all-1, and sets said output value thereof to said LUT output value when said corresponding value of said color-reduced image data is neither all-0 nor all-1.

10. The controller driver according to claim 8, further comprising a drive circuit applying drive voltages a selected line of pixels, respectively, in response to said output image data, wherein polarities of said drive voltages are inverted every frame period, and wherein said counter outputs said counter value so that said polarities of said drive voltages applied to said selected line of pixels are opposite in every two neighboring frame periods in which said counter values generated therein are same.

11. The controller driver according to claim 7, wherein said preceding image processing stage performs said color-reduction processing and said latter image processing stage performs said modification processing, when a total number of bits of said input image data for one frame image is larger than a capacity of said memory, and wherein said preceding image processing stage transfers said input image data to said memory and said latter image processing stage transfers said input image data from said memory to said driver circuit, when said total number of bits of said input image data for one frame image is equal to or less than said capacity of said memory.

12. A display device comprising:

a binary LUT (lookup table) outputting an LUT output value in response to coordinate data of a target pixel and a counter value updated every frame period, independent of color reduced image data; and a selector section performing addition operation on image data in response to said LUT output value to generate output image data, wherein a value of an output image data is identical to a corresponding value of a color-reduced image data when the LUT output value from the binary LUT comprises a first value, while the value of the output image data is modified from the corresponding value of the color-reduced image data when the LUT output value is a second value different from the first value.

13. The display device according to claim 1, wherein said latter image processing stage further comprises a maximum/minimum value processing unit outputting an output value selected from said LUT output value and said second value, in response to said color-reduced image data.

14. The display device according to claim 1, wherein the LUT output value from the binary LUT is constant over a frame period for each one of the frame periods.

15. The controller driver according to claim 7, wherein a frequency of the LUT output value being set to a first or second value is fixed to a constant value over a frame period.

16. The display device according to claim 12, wherein a LUT output value from the binary LUT is constant over a frame period for each one of the frame periods.

17. The display device according to claim 1, wherein the controller driver further comprises an instruction processing circuit that receives the input image data and control signals, the instruction processing circuit transferring the input image data to the preceding image processing stage and generates coordinate data and timing control signal in response to the input image data and the control signals, the instruction processing data providing the coordinate data and the timing control signal to the latter image processing stage.

18. The display device according to claim 17, wherein the instruction processing circuit generates the output image data in response to the coordinate data and the timing control signal.

19. The controller driver according to claim 7, wherein the controller driver further comprises an instruction processing circuit that receives the input image data and control signals, the instruction processing circuit transferring the input image data to the preceding image processing stage and generates coordinate data and timing control signal in response to the input image data and the control signals, the instruction processing data providing the coordinate data and the timing control signal to the latter image processing stage, and wherein the instruction processing circuit generates the output image data in response to the coordinate data and the timing control signal.

20. The display device according to claim 12, further comprising an instruction processing circuit that receives an input image data and control signals, the instruction processing circuit transferring the input image data to a preceding image processing stage and generates coordinate data and timing control signal in response to the input image data and the control signals, instruction processing data from the instruction processing circuit providing the coordinate data and the timing control signal to a latter image processing stage, wherein the instruction processing circuit generates the output image data in response to the coordinate data and the timing control signal.

* * * * *